(12) United States Patent
Alleva et al.

(10) Patent No.: US 12,434,711 B2
(45) Date of Patent: Oct. 7, 2025

(54) METHOD AND RELATED SYSTEM FOR ESTIMATING THE INTERNATIONAL ROUGHNESS INDEX OF A ROAD SEGMENT

(71) Applicant: Bridgestone Europe NV/SA [BE/BE], Zaventem (BE)

(72) Inventors: Lorenzo Alleva, Rome (IT); Alessandro Boldrini, Rome (IT); Manfredi Massimilla, Rome (IT); Vittorio Nicolosi, Rome (IT); Alberto Nantuono, Rome (IT)

( * ) Notice: Subject to any disclaimer, the term of this patent is extended or adjusted under 35 U.S.C. 154(b) by 173 days.

(21) Appl. No.: 18/288,398

(22) PCT Filed: Apr. 26, 2022

(86) PCT No.: PCT/EP2022/061044
§ 371 (c)(1),
(2) Date: Oct. 26, 2023

(87) PCT Pub. No.: WO2022/229180
PCT Pub. Date: Nov. 3, 2022

(65) Prior Publication Data
US 2024/0208511 A1    Jun. 27, 2024

(30) Foreign Application Priority Data
Apr. 26, 2021   (IT) .................. 102021000010496

(51) Int. Cl.
*B60W 40/02*   (2006.01)
*B60W 40/06*   (2012.01)
*G06F 17/17*   (2006.01)

(52) U.S. Cl.
CPC ............ *B60W 40/06* (2013.01); *G06F 17/17* (2013.01); *B60W 2510/222* (2013.01);
(Continued)

(58) Field of Classification Search
USPC .................. 701/1, 36, 37, 51, 65, 70–92
See application file for complete search history.

(56) References Cited

U.S. PATENT DOCUMENTS

| | | | | |
|---|---|---|---|---|
| 11,447,150 B2* | 9/2022 | Du | ............ | B60W 40/06 |
| 11,952,012 B2* | 4/2024 | Lee | ............ | G06V 20/58 |

(Continued)

FOREIGN PATENT DOCUMENTS

| | | |
|---|---|---|
| CN | 110001336 A | 7/2019 |
| EP | 3178674 A1 | 6/2017 |

(Continued)

OTHER PUBLICATIONS

Liu Wei et al, "On-line estimation of road profile in semi-active suspension based on unsprung mass acceleration", Mechanical Systems and Signal Processing, Elsevier, Amsterdam, NL, vol. 135, 24, XP085895993, ISSN: 0888-3270, DOI: 10.1016/J.YMSSP.2019. 106370, figure 2, Sep. 24, 2019.

(Continued)

*Primary Examiner* — Jonathan L Sample
(74) *Attorney, Agent, or Firm* — Patterson Intellectual Property Law, PC

(57) ABSTRACT

A system and a method for estimating the International Roughness Index (IRI) of a road or road segment includes determining the IRI as a function of physical quantities relating to the motion of a vehicle, for instance the vertical accelerations, and to the vehicle itself, for instance the damping and stiffness coefficients of the suspensions of the vehicle and the tires mounted on the vehicle.

20 Claims, 9 Drawing Sheets

(52) U.S. Cl.
CPC ... *B60W 2510/225* (2013.01); *B60W 2552/35* (2020.02); *B60W 2554/4042* (2020.02)

(56) References Cited

U.S. PATENT DOCUMENTS

| | | | |
|---|---|---|---|
| 2014/0070935 A1* | 3/2014 | Wang | B60C 23/0469 |
| | | | 290/1 A |
| 2015/0224845 A1* | 8/2015 | Anderson | B60G 17/052 |
| | | | 701/37 |
| 2020/0031188 A1* | 1/2020 | Wang | B60G 17/015 |
| 2020/0139784 A1* | 5/2020 | Sridhar | B60G 21/08 |
| 2020/0406925 A1* | 12/2020 | Du | G06F 16/29 |
| 2022/0410927 A1* | 12/2022 | Lee | B60W 60/0051 |
| 2024/0116325 A1* | 4/2024 | Cotto | B60G 17/0162 |

FOREIGN PATENT DOCUMENTS

| | | | | |
|---|---|---|---|---|
| EP | 3178674 B1 * | 9/2018 | ......... | B60C 23/0408 |
| WO | WO-2022207700 A1 * | 10/2022 | ............ | B60W 40/06 |

OTHER PUBLICATIONS

International Search Report, corresponding application No. PCT/EP2022/061044, Aug. 31, 2022, 3 pages.

\* cited by examiner

METHOD AND RELATED SYSTEM FOR ESTIMATING THE INTERNATIONAL ROUGHNESS INDEX OF A ROAD SEGMENT

TECHNICAL FIELD OF THE INVENTION

The present invention relates, in general, to automotive and road pavement monitoring sectors. More specifically, the present invention concerns a system and a method for estimating the International Roughness Index (IRI). In particular, according to an aspect of the present invention, the estimation of the IRI is determined as a function of physical quantities relating to the motion of a vehicle, for instance the vertical accelerations, and to the vehicle itself, for instance the damping and stiffness coefficients of the suspensions of the vehicle and the tires mounted on the vehicle.

The present invention may be applied in any type of road vehicle, either used for transporting people, such as a car, a bus, a camper, etc., or for transporting wares, such as industrial vehicles (trucks, tractor trailer, etcetera) or light or medium-heavy commercial vehicles (such as vans, etc.). Without any loss of generality, reference will be made to a motor vehicle, such as one or more cars and/or buses and/or trucks and/or motorbikes, etc., fitted with internal combustion engines and/or of the hybrid and/or electric type (s).

STATE OF THE ART

As is known, road pavements need to be designed to ensure a rolling surface that is substantially regular and with little deformation in order to meet safety and comfort requirements for motor vehicles driven thereon. In fact, an impact of a wheel of a motor vehicle against/on an obstacle on the road pavement (such as a pothole or a bump) can cause a damage to the tire of the wheel, in particular to the carcass (i.e., the casing) thereof. For example, an external bulge on the sidewall of a tire typically indicates that cords have been broken inside the carcass due to an impact against/on an obstacle, since driving on objects like bumps and potholes can cause individual cords to break. If a damaged tire (e.g., a tire with some damaged cords) is not promptly detected and, hence, is not promptly repaired/replaced, if the driver keeps on driving with said damaged tire, there a is risk of completely breaking/destroying the carcass of the tire and even of damaging the wheel rim and/or the suspension (for example, in case of further impacts of the damaged tire against/on other obstacles).

Nowadays, periodical monitoring of regularity/smoothness level of individual roads is carried out from time to time, mainly for the purpose of planning maintenance works. Typically, said monitoring is based on a computation of the International Roughness Index (IRI), which is the roughness index most commonly used for irregularity of road pavements. IRI is typically obtained by measuring longitudinal road profiles (more specifically, longitudinal profiles of elevation of road pavements), in particular by using a quarter-car vehicle mathematical model (also known as Quarter-Car Model, abbreviated as QCM) or a full-car vehicle mathematical model (also known as Full-Car Model, abbreviated as FCM), whose response is accumulated to yield a roughness index with units of slope (in/m, m/km, etcetera).

Unfortunately, IRI measurements are actually rather expensive and difficult to run on a big scale on the whole road network managed by a company.

Therefore, in the automotive and road pavement monitoring sectors it is markedly felt the need for innovative technical solutions for enabling faster and easier detection of road pavement irregularities/unevenness.

An example of a known solution is disclosed, e.g., in patent application WO 2020/225699 A1 which discloses a method and a system for recognition of irregularities of a road pavement. In particular, WO 2020/225699 A1 concerns a method comprising:

a) a preliminary test step including in turn:
   a sub-step wherein tests are performed in having pneumatic tires drive over and/or impact different irregularities at different speeds of a motor vehicle;
   a sub-step wherein during the tests the vertical acceleration is acquired (conveniently at a sampling rate of at least 10 Hz); and
   a sub-step for the construction of at least one first model for associating the standard deviation of the vertical acceleration in relation to the tests performed with the irregularities on the road pavement; and b) an actual recognition step including in turn:
   a sub-step wherein the vertical acceleration is acquired (conveniently at a sampling rate of at least 10 Hz);
   a sub-step wherein high-pass filtering of the vertical acceleration is implemented, wherein a minimum filtering threshold of the high-pass filter is preferably less than or equal to 0.1 Hz, and wherein the sub-step of filtering is performed on a reference section of the road pavement of variable length having a length of between 2 and 25 linear meters, preferably between 5 and 10 linear meters;
   a sub-step wherein the vertical acceleration is processed by means of a Fast Fourier Transform (FFT);
   a sub-step wherein the standard deviation of the processed vertical acceleration is calculated by means of an FFT at the relevant frequencies, wherein the relevant frequencies comprise a first range of vibration frequencies of the motor vehicle suspension system that is preferably between 1.5 Hz and 3 Hz; and
   recognizing the presence and the dimensions of the irregularities on the road pavement on the basis of a comparison between said first model and the standard deviation of the processed vertical acceleration by means of an FFT at the relevant frequencies.

According to WO 2020/225699 A1, the relevant frequencies conveniently comprise a second range of vibration frequencies of the chassis of the motor vehicle, the step b) conveniently comprises the further sub-steps of acquiring information regarding the position of the vehicle by means of a GPS signal, and locating any irregularities depending upon the position of the vehicle, and the step a) conveniently comprises the further sub-steps of performing the tests by means of having different types of tires on different types of motor vehicle drive over and/or impact, and of constructing a number of models in order to associate the standard deviation of the vertical acceleration with the type of tire and/or motor vehicle.

Additionally, according to WO 2020/225699 A1, the step a) preferably includes also:
   a sub-step wherein, during the tests performed, the wheel speeds and the speeds of the motor vehicle are acquired and wherein the normalized wheel speeds relating to the tests performed are calculated by means of the ratio between the wheel speeds and the respective speeds of the motor vehicle; and a sub-step for the construction of at least one second model for associating the standard deviation of the normalized wheel speeds with the irregularities on the road pavement.

Finally, according to WO 2020/225699 A1, the step b) preferably includes:

a sub-step wherein the steering angle of the wheel of said motor vehicle is acquired;

a sub-step wherein the steering angle of the wheel of said motor vehicle is acquired by means of an FFT;

a sub-step wherein a minimum threshold is determined within the frequency content of the steering angle of the wheel processed by means of the FFT;

a sub-step wherein the wheel speeds are acquired;

a sub-step wherein the speeds of the motor vehicle are acquired;

a sub-step wherein the normalized wheel speeds are calculated by means of the ratio between the wheel speeds and the respective speeds of the motor vehicle;

a sub-step wherein high-pass filtering of the wheel speeds or of the normalized wheel speeds is performed in applying said minimum threshold; and a sub-step wherein the standard deviation of the normalized wheel speeds is calculated;

wherein the sub-step of recognizing the presence of irregularities on the road pavement conveniently implies using both the comparison between the first model and the standard deviation of the processed vertical acceleration by means of an FFT at the relevant frequencies and the comparison between the second model and the standard deviation of the normalized wheel speeds.

OBJECT AND SUMMARY OF THE INVENTION

In view of the foregoing, the Applicant has felt the need to carry out an in-depth study in order to try developing an innovative technical solution for enabling, in general, faster and easier quantification of roughness of road pavements and, in particular, an IRI-like estimation, which are easier to perform and can be carried out more frequently than traditional IRI measurements, thereby arriving at the present invention.

Thence, object of the present invention is that of providing a technical solution for implementing, in general, a faster and easier quantification of roughness of road pavements and, in particular, an IRI-like estimation, which are easier to perform and can be carried out more frequently than traditional IRI measurements.

This and other objects are achieved by the present invention in that it relates to a system and a method for estimating the IRI, as defined in the attached claims.

BRIEF DESCRIPTION OF THE DRAWINGS

For a better understanding of the present invention, preferred embodiments, which are intended purely by way of non-limiting examples, will now be described with reference to the attached drawings (all not to scale), where.

DETAILED DESCRIPTION OF PREFERRED EMBODIMENTS OF THE INVENTION

The present invention will now be described in detail with reference to the attached figures to allow a skilled person to make and use it. Various modifications to the embodiments described will be immediately apparent to a skilled person and the generic principles described can be applied to other embodiments and applications without thereby departing from the scope of the present invention, as defined in the attached claims. Therefore, the present invention should not be considered limited to the embodiments described and illustrated herein, but should be accorded the broadest scope of protection consistent with the described and claimed features.

Unless otherwise defined, all technical and scientific terms used herein have the same meaning commonly used by persons of ordinary experience in the field pertaining to the present invention. In the event of a conflict, this description, including the definitions provided, will be binding. Furthermore, the examples are provided for illustrative purposes only and as such should not be regarded as limiting.

In particular, the block diagrams included in the attached figures and described below are not intended as a representation of the structural characteristics, or constructive limitations, but must be interpreted as a representation of functional characteristics, i.e. intrinsic properties of the devices and defined by the effects obtained or functional limitations and which can be implemented in different ways, therefore in order to protect the functionality of the same (possibility of functioning).

In order to facilitate the understanding of the embodiments described herein, reference will be made to some specific embodiments and a specific language will be used to describe them. The terminology used herein has the purpose of describing only particular embodiments, and is not intended to limit the scope of the present invention.

The present invention concerns a method for estimating the International Roughness Index (IRI), in particular as a function of physical quantities relating to the motion of a vehicle, for instance the vertical accelerations, and to the vehicle itself, for instance the damping and stiffness coefficients of the suspensions of the vehicle and the tires mounted on the vehicle.

Figure 1:
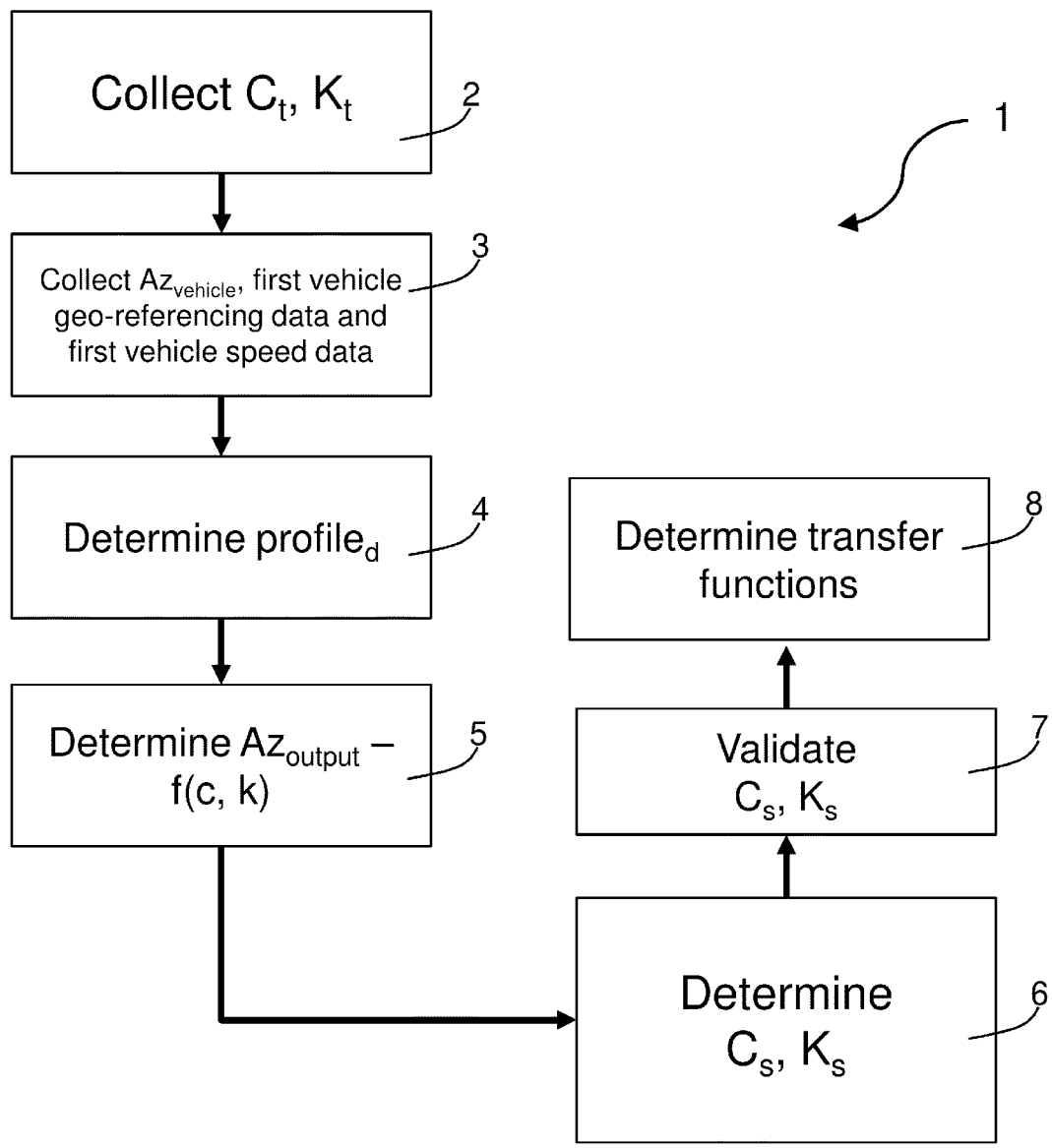
FIGS. 1 and 2 schematically and respectively illustrate a preliminary step and an IRI estimation step of an IRI estimation method according to a preferred embodiment of the present invention.
Figure 2:
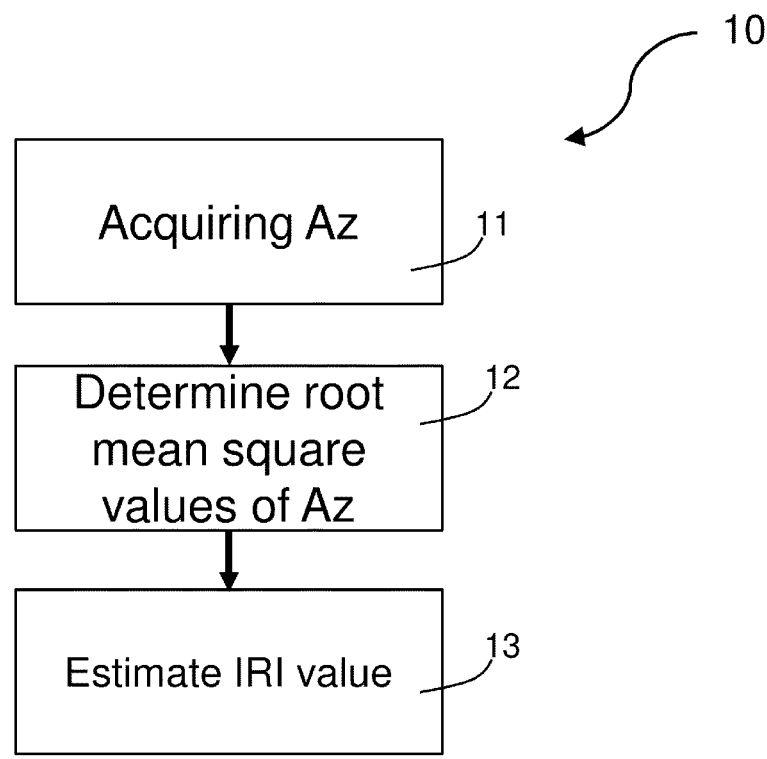

With reference to FIGS. 1 and 2, the method according to the present invention comprises a preliminary step 1 and an IRI estimation step 10. Furthermore, hereinafter reference to a motor vehicle such as one or more cars and/or buses and/or trucks and/or motorbikes, etcetera, fitted with internal combustion engines and/or of the hybrid and/or electric type(s), will be made.

In particular, FIG. 1 schematically illustrates the preliminary step 1 of the method for estimating the IRI according to the present invention. In detail, the preliminary step 1 comprises:

- collecting (block 2) values of vehicle tire damping and stiffness coefficients $C_t$, $K_t$ of one or more tires (not shown) of one or more motor vehicles;
- collecting (block 3):
  - a) first vehicle vertical acceleration values $Az_{vehicle}$ measured on one or more motor vehicles driven at one or more given constant speeds along one or more roads or road segments to which known international roughness index values or known first road profiles $profile_r$ are associated;
  - b) first vehicle geo-referencing data associated with the measured first vertical acceleration values $Az_{vehicle}$; and
  - c) first vehicle speed data indicative of the given constant speed (s) associated with the measured first vertical acceleration values $Az_{vehicle}$; and
- determining (block 4) second road profiles $profile_d$ based on the first values of vehicle tire damping and stiffness coefficients $C_t$, $K_t$, the first vehicle geo-referencing data, the first vehicle speed data, and the first vehicle vertical acceleration values $Az_{vehicle}$, The preliminary step 1 further comprises:

- determining (block 5) second vehicle vertical acceleration values $Az_{output}$-$f$(c, k) based on the second road profiles $profile_d$, second vehicle geo-referencing data of the second vertical acceleration values $Az_{output}$-$f$(c, k), second vehicle speed data indicative of the given constant speed (s) associated with the measured first vertical acceleration values $Az_{vehicle}$, and the values of vehicle tire damping and stiffness coefficients $C_t$, $K_t$;
- determining (block 6) values of vehicle suspension damping and stiffness coefficients $C_s$, $K_s$ of one or more suspensions of one or more vehicles;
- determining (block 7) first and second root mean square values of the first and second vehicle vertical acceleration values $Az_{vehicle}$, $Az_{output}$-$f$(c, k), respectively; and
- determining (block 8), based on the known International Roughness Index values or the first road profiles $profile_r$, on the second root mean square values of the second vehicle vertical acceleration values $Az_{output}$-$f$(c, k), on the second vehicle geo-referencing data and on second vehicle speed data, one or more vehicle transfer functions mathematically relating the second root mean square values of the second vehicle vertical acceleration values $Az_{output}$-$f$(c, k) and the International Roughness Index values at the given constant speed (s), FIG. 2 schematically illustrates the IRI estimation step 10 of the method for estimating the IRI according to the present invention. In particular, the IRI estimation step 10 comprises:

- acquiring (block 11) third vehicle vertical acceleration values Az measured on a given motor vehicle driven at a driving speed on a given road or road segment, third vehicle geo-referencing data associated with the third vehicle vertical acceleration values Az and third vehicle speed data indicative of the given driving speed of the motor vehicle;
- computing (block 12) third root mean square values of the third vehicle vertical acceleration values Az; and
- estimating an International Roughness Index (IRI) value (block 13) of the given road or road segment based on one or more vehicle transfer functions determined in the preliminary step 1 and on the third root mean square values of the third vehicle vertical acceleration values Az and the associated third vehicle geo-referencing data and the third vehicle speed data.

According to an aspect of the present invention, the third vehicle geo-referencing data of the given motor vehicle are namely data indicative of 2D/3D position, e.g. GPS position, of the given motor vehicle.

According to an aspect of the present invention, the first vehicle vertical acceleration values $Az_{vehicle}$, the first vehicle geo-referencing data, and the first vehicle speed data are collected in steps a), b) and c) in respect of one or more motor vehicles of one and the same given vehicle type and/or of one and the same given vehicle model driven at one or more given constant speeds along one or more roads or road segments for which International Roughness Index values or the first road profiles $profile_r$ are known; furthermore, the second road profiles $profile_d$ are specific to said given vehicle type and/or model.

According to another aspect of the present invention, the first vehicle vertical acceleration values $Az_{vehicle}$, the first vehicle geo-referencing data, and the first vehicle speed data are collected in steps a), b) and c) in respect of each one of one or more motor vehicles of different given vehicle types and/or of different given vehicle models; furthermore, the second road profiles $profile_d$ are specific to each one of said given vehicle types and/or models.

Therefore, according to an aspect of the present invention, the International Roughness Index values is estimated (block 13) by using a vehicle transfer function specific to vehicle type/model of the given motor vehicle determined in the preliminary step 1.

Once again with reference to FIG. 1, in the preliminary step 1, the vehicle tire damping and stiffness coefficients $C_t$, $K_t$ are determined through tire tests, such as, for example, dedicated deflection tests.

Furthermore, according to an aspect of the present invention, the step of collecting (block 3) first vehicle vertical acceleration values $AZ_{vehicle}$, first vehicle geo-referencing data and first vehicle speed data include a vehicle telemetry data acquisition, wherein vehicles are conveniently equipped with a data logger unit acquiring the first vehicle vertical accelerations $Az_{vehicle}$ and the first vehicle geo-referencing data as GPS positions of the vehicles with predefined acquisition frequencies. Furthermore, the telemetry data are automatically transmitted to a remote computing system (e.g., a cloud computing system) via a wireless connection (e.g., based on 2G, 3G, 4G or 5G cellular technology). In particular, the acquisition frequency for the first vehicle geo-referencing data is for instance greater than 1 Hz. Furthermore, in order to determine the first vehicle vertical acceleration values $Az_{vehicle}$, the vehicle is driven through bumps of known geometry (i.e., according, for instance, to the first road profile $profile_r$) at low speed (e.g., up to 40 km/h); in further detail the acquisition frequency of the first vehicle vertical acceleration values $Az_{vehicle}$ is higher than or equal to 10 Hz. Additionally, a predefined time period (e.g., of three months) can be conveniently considered for the vehicle telemetry data acquisition, wherein said predefined time period preferably includes the date of measurement of the IRI values.

According to an aspect of the invention, in the preliminary step 1, here the IRI values related to a road are determined according to a corresponding first road profile $profile_r$, the latter being determined according to standardized procedures; for example, the first road profile $profile_r$ is determined by interpolating previously measured values of vertical accelerations, determined according to certain conditions (e.g., low speed and with a predetermined acquisition frequency) specific to vehicle type/model of given motor vehicle.

According to a further aspect of the present invention, GPS is used for positioning the vehicles on the road where the measurements are carried out either in the preliminary step 1 and in the IRI estimation step 10.

With reference to FIG. 1, in the preliminary step 1, the step of determining (block 5) the second vehicle vertical acceleration values $Az_{output}$-$f$(c, k) comprises determining:
fourth vehicle vertical acceleration values $Az_{output}$ which are the acceleration values outputted by the second road profiles profile$_d$ when inputted with the values of vehicle tire damping and stiffness coefficients $C_t$, $K_t$; and
a vehicle vertical acceleration function $f$(c, k) depending on parameters c and k.

In particular, parameters c and k are vehicle suspension damping and stiffness coefficients values of one or more suspensions (not shown) of the considered vehicle. Thus, the output of the second road profiles profile$_d$ (which are values of vehicle vertical accelerations) directly depends on the values of the vehicle suspension damping and stiffness coefficients c, k of the one or more suspensions of the considered motor vehicle.

Figure 3:
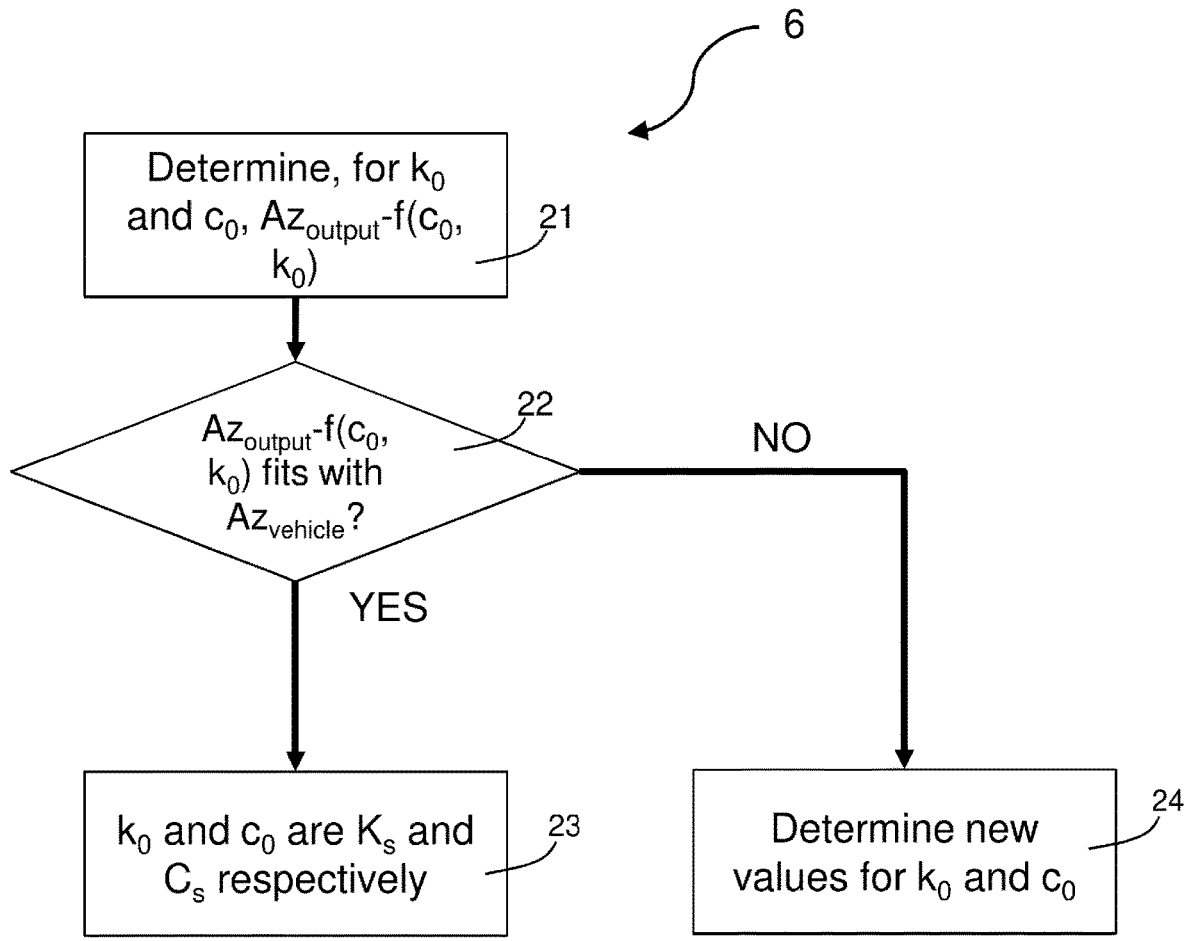
FIG. 3 schematically illustrates a step of a preliminary step for determining parameters relative to a vehicle.

With reference to FIG. 3, the step of determining (block 6) the values of vehicle suspension damping and stiffness coefficients $C_s$, $K_s$ of the one or more suspensions of the one or more vehicles comprises:
determining (block 21), for test vehicle suspension damping and stiffness coefficients values $c_0$, $k_0$ of the suspensions of the vehicle inputted in the second road profiles profile$_d$, corresponding second vehicle vertical acceleration values $Az_{output}$-$f$(c, k), also referred to as $Az_{output}$-$f$($c_0$, $k_0$); and
verifying (block 22) if the second acceleration profiles generated from the second vehicle vertical acceleration values $Az_{output}$-$f$($c_0$, $k_0$) fit with first acceleration profiles generated from the first vehicle vertical acceleration values $Az_{vehicle}$, Furthermore, the step of determining (block 6) the values of vehicle suspension damping and stiffness coefficients $C_s$, $K_s$ of the one or more suspensions of the one or more vehicles further comprises:
if the second acceleration profiles generated from the second vehicle vertical acceleration values $Az_{output}$-$f$ ($c_0$, $k_0$) fit with the first acceleration profiles generated from the first vehicle vertical acceleration values $Az_{vehicle}$, determining (block 23) that the test vehicle damping and stiffness coefficients values $c_0$, $k_0$ of the suspensions of the vehicle are the vehicle suspension damping and stiffness coefficients $C_s$, $K_s$; or
if the second acceleration profiles generated from the second vehicle vertical acceleration values $Az_{output}$-$f$ ($c_0$, $k_0$) do not fit with the first acceleration profiles generated from the first vehicle vertical acceleration values $Az_{vehicle}$, determining (block 24) new values for the test vehicle suspension damping and stiffness coefficients values $c_0$, $k_0$.

Thus, according to an aspect of the present invention, the steps of determining (block 21) and verifying (block 22) are repeated until the test vehicle damping and stiffness coefficients values $c_0$, $k_0$ of the suspensions of the vehicle fulfil the requirement of the step of verifying (block 22) and, thus, can be defined as the vehicle suspension damping and stiffness coefficients $C_s$, $K_s$.

At the end of the step of determining (block 6) the values of vehicle suspension damping and stiffness coefficients $C_s$, $K_s$ of the one or more suspensions of the one or more vehicles are determined as an output of the second road profile profile$_d$.

Figure 4:
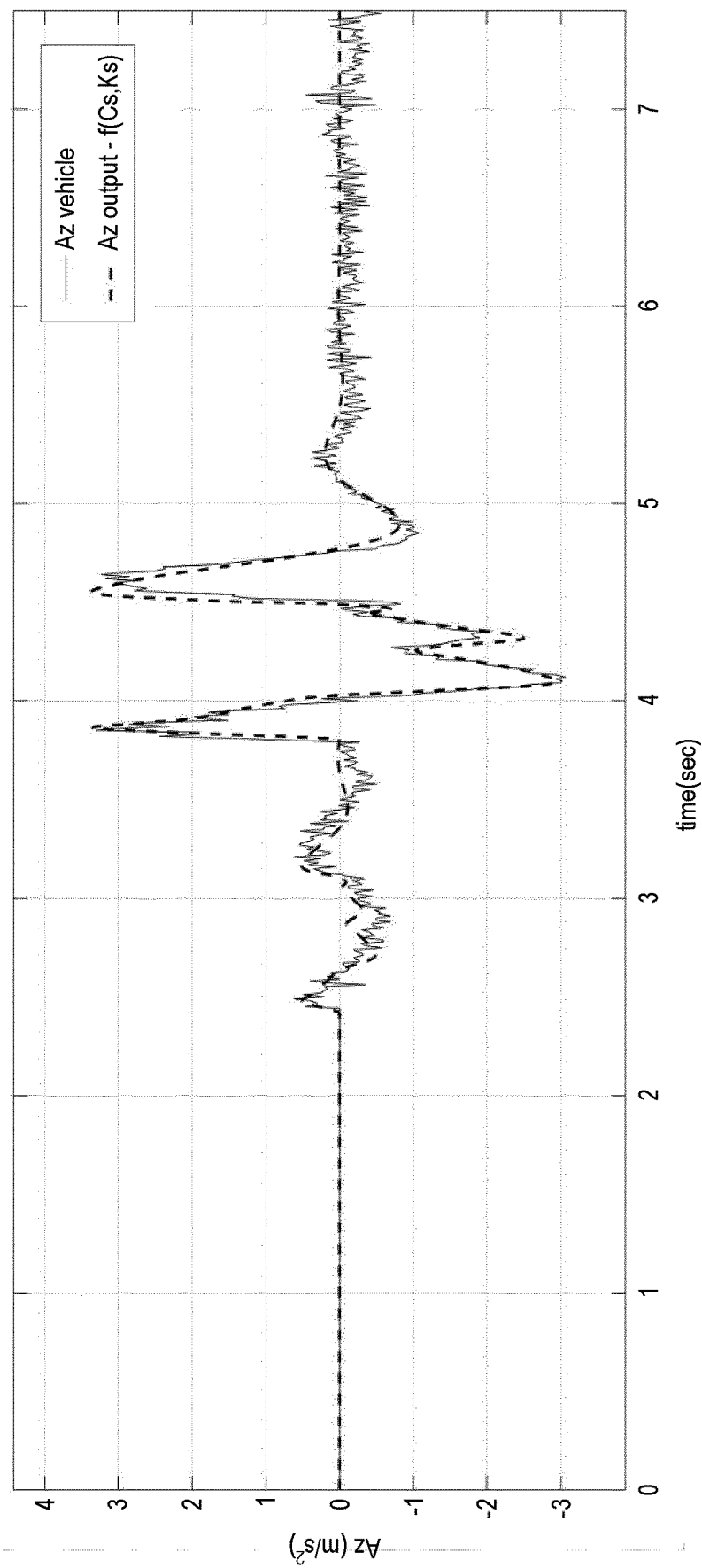
FIG. 4 schematically shows trends for vertical acceleration values according to different road profiles.

FIG. 4 schematically shows examples of first and second acceleration profiles generated from the first and the second vehicle vertical acceleration values $Az_{vehicle}$, $Az_{output}$-$f$(c, k), wherein c and k are equal to the vehicle suspension damping and stiffness coefficients values $C_s$, $K_s$.

Figure 5:
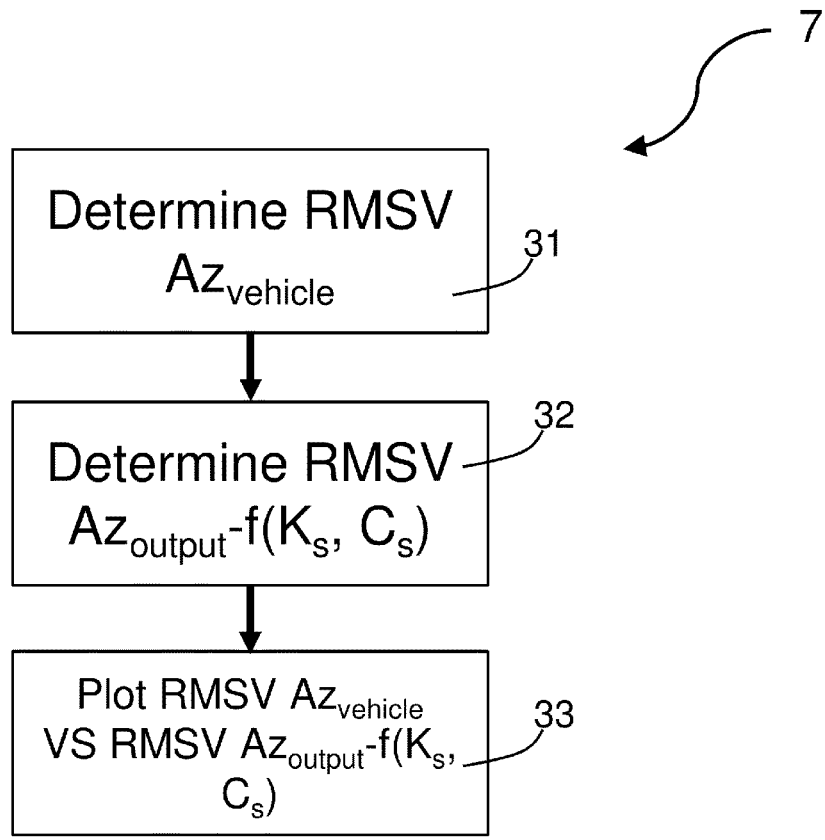
FIG. 5 schematically illustrates a step of a preliminary step for validating parameters relative to a vehicle.

Furthermore, with reference to FIG. 5, in the preliminary step 1, the step of determining (block 7) the first and second root mean square values of the first and second vehicle vertical acceleration values $Az_{vehicle}$, $Az_{output}$-$f$(c, k), respectively comprises:
computing (block 31) first root mean square values of the first vehicle vertical acceleration values $Az_{vehicle}$ based on the first road profiles profile$_r$ and in respect of a motor vehicle driven on a known road at known different speeds;
determining (block 32) second root mean square values of the second vehicle vertical acceleration values $Az_{output}$-$f$(c, k) based on the second road profiles profile$_d$, the vehicle suspension damping and stiffness coefficients values $C_s$, $K_s$ and in respect to a motor vehicle driven on the same known road and at the same known different speeds; and
plotting (block 33) the first root mean square values of the first vehicle vertical acceleration values $Az_{vehicle}$ with respect to the second root mean square values of the second vehicle vertical acceleration values $Az_{output}$-$f$ (c, k), hereinafter also referred to as $Az_{output}$-$f$($C_s$, $K_s$), thereby verifying if the second road profiles profile$_d$ has been fitted well enough to match the results of the first road profiles profile$_r$.

Figure 6:
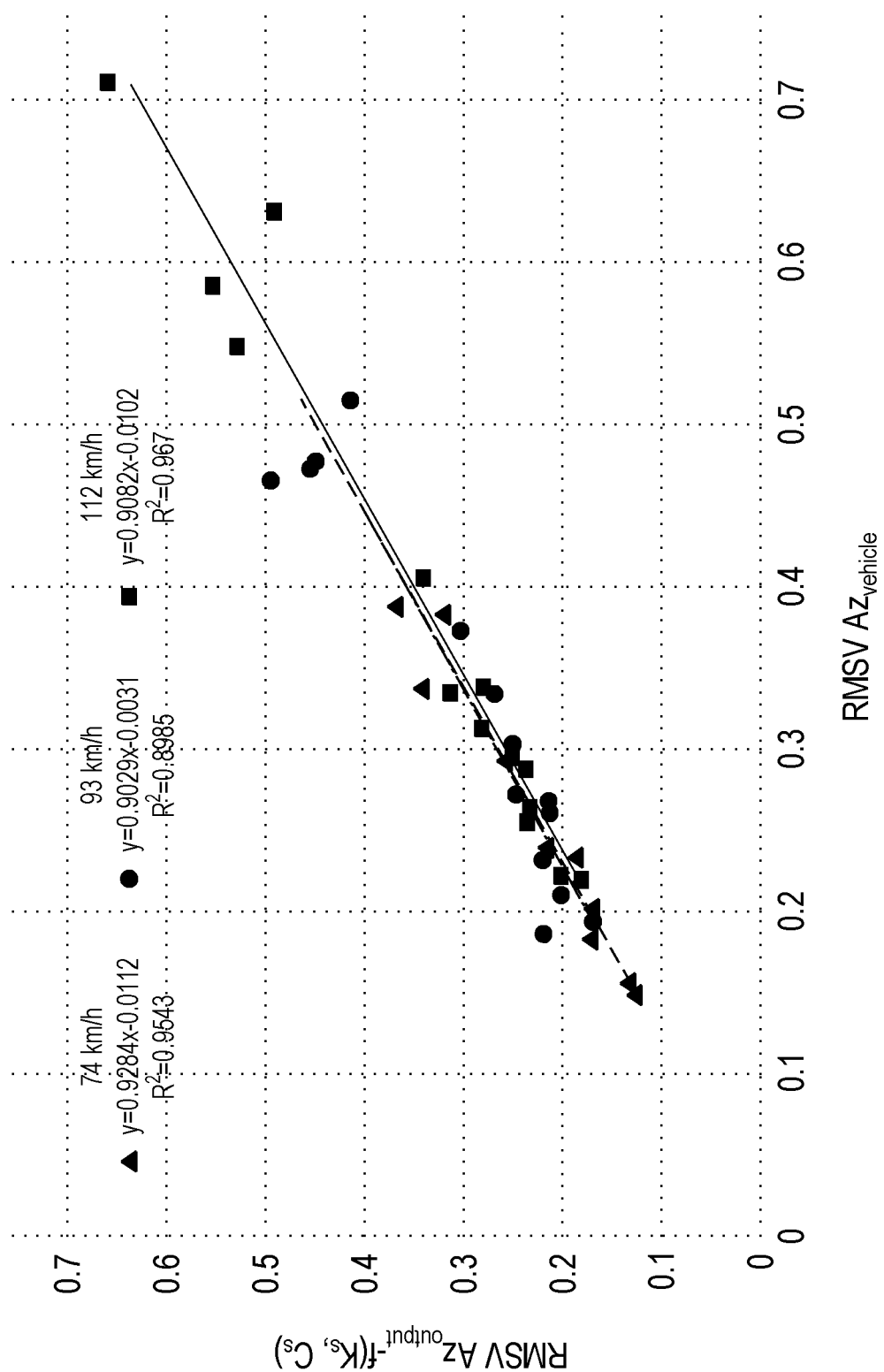
FIG. 6 schematically shows a plot correlating root mean square values of respective vehicle vertical acceleration values obtained according to a real and a digitized road profiles.

In particular, the step of plotting (block 33) is carried out by plotting the first RMSVA of the first vehicle vertical acceleration values $Az_{vehicle}$ with respect to the second RMSVA of the second vehicle vertical acceleration values $Az_{output}$-$f$($C_s$, $K_s$) along with known IRI values of the considered road. FIG. 6 shows the plot obtained through the step of plotting (block 33) carried out by plotting the first RMSVA of the first vehicle vertical acceleration values $Az_{vehicle}$, filtered at 1.5 Hz, with respect to the second RMSVA of the second vehicle vertical acceleration values $Az_{output}$-$f$($C_s$, $K_s$). As it can be seen in FIG. 6, different velocities are considered.

Figure 7:
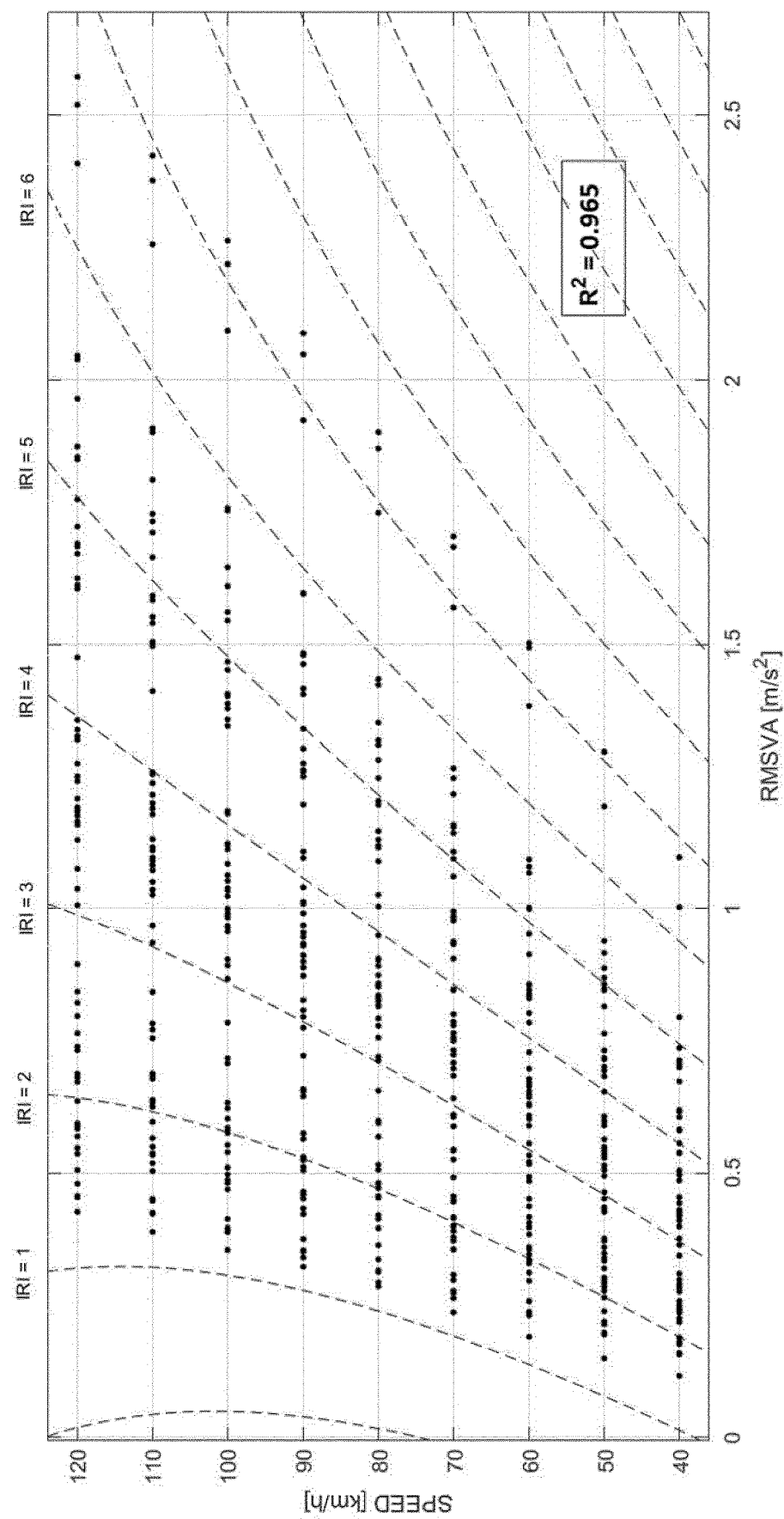
FIG. 7 schematically shows plots correlating IRI values with root mean square values of vehicle vertical acceleration values at different constant vehicle speeds.

Furthermore, in the preliminary step 1, determining (block 8), based on the known International Roughness Index values or the first road profiles profile$_r$, on the second root mean square values of the second vehicle vertical acceleration values $Az_{output}$-$f$(c, k), on the second vehicle geo-referencing data and on second vehicle speed data, one or more vehicle transfer functions mathematically relating the second root mean square values of the second vehicle vertical acceleration values $Az_{output}$-$f$(c, k) and the International Roughness Index values at the given constant speed (s) comprises identifying a related mathematical correlation between the IRI values and the second RMSVA of the second vehicle vertical acceleration values $Az_{output}$-$f$ ($C_s$, $K_s$), whereby a vehicle transfer function IRI= $\mathcal{F}$(RMSVA, speed) is determined. In this respect, FIG. 7 shows examples of IRI-RMSVA graphs at different constant vehicle speeds, wherein the IRI values at different constant vehicle speeds are plotted, and the second RMSVA determined from the second vehicle vertical acceleration values $Az_{output}$-$f$($C_s$, $K_s$) are plotted; in particular, an example of a transfer function shown in FIG. 7 is the following:

$$IRI = 1.521 + 8.152 \cdot RMSVA - 0.035 \cdot v - \\ 0.3403 \cdot RMSVA^2 - 0.044 \cdot RMSVA \cdot v + 1.98 \cdot 10^{-4} \cdot v^2$$

wherein v denotes the vehicle speed.

Again with reference to FIG. 2, in the IRI estimation step 10 and regarding the third vehicle vertical acceleration values Az, the step of estimating an International Roughness Index value (block 13) of the given road or road segment based on one or more vehicle transfer functions determined in the preliminary step 1 and on the third root mean square values of the third vehicle vertical acceleration values Az and the associated third vehicle geo-referencing data and the third vehicle speed data is carried out by performing an inverse calculation. In fact, once at least one transfer function is determined in the preliminary step 1, the third root mean square values determined from the third vehicle vertical acceleration values Az and the driving speed v of a given vehicle on a generic road are known, it is possible to calculate an estimated IRI value.

Figure 8:
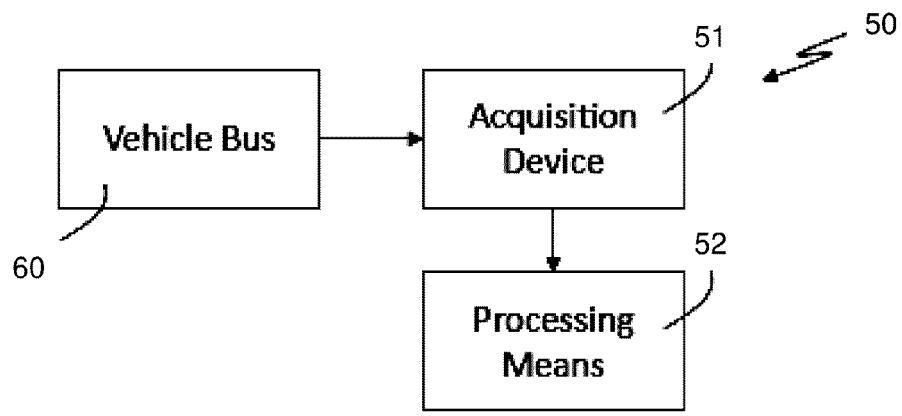
FIGS. 8-10 schematically illustrate preferred embodiments of an IRI estimation system.

The present invention concerns also a system designed to carry out the above IRI estimation method. In this respect, FIG. 8 schematically illustrates, by means of a block diagram, a functional architecture of an IRI estimation system 50 according to a preferred embodiment of the present invention.

In particular, the IRI estimation system 50 includes an acquisition device 51 that is:
- installed on board a motor vehicle (not shown in FIG. 8), such as a car or bus or truck or motorbike, etc., that is fitted with an internal combustion engine or of the hybrid/electric type;
- coupled to a vehicle bus 60 (e.g. based upon a standard Controller Area Network, CAN, bus) of said motor vehicle; and
- configured to acquire, from said vehicle bus 60, vehicle vertical accelerations and vehicle geo-referencing and speed data.

According to a preferred embodiment of the present invention, a respective acquisition device 51 is installed on board:
- each motor vehicle used to carry out the preliminary step 1 to acquire, from a respective vehicle bus 60 of said motor vehicle, the first and the second vehicle vertical acceleration values $Az_{vehicle}$, $Az_{output}$=$f$(c, k) and the first and second vehicle geo-referencing and the first and second vehicle speed data; and
- each given motor vehicle involved in the IRI estimation step 10 to acquire, from a respective vehicle bus 60 of said given motor vehicle, the third vehicle vertical acceleration values Az and the third vehicle geo-referencing and speed data.

Additionally, the IRI estimation system 50 further includes processing means 52 connected, in a wired or wireless fashion, to the acquisition device (s) 51 to receive therefrom the first, second and third vehicle vertical acceleration values $Az_{vehicle}$, $Az_{output}$=$f$(c, k), Az and the first, second and third vehicle geo-referencing and the first, second and third vehicle speed data, and programmed to:
- compute the first and the second root mean square values $Az_{vehicle}$, $Az_{output}$=$f$(c, k) and determine (block 8) the vehicle transfer function (s); and
- compute the third root mean square values and estimate the IRI value (s) (block 13).

Figure 9:
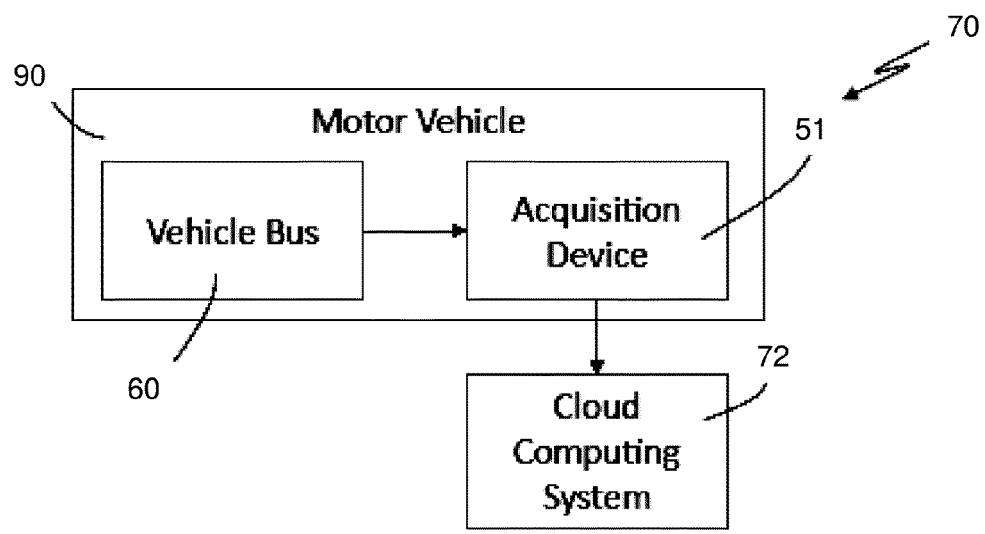
Figure 10:
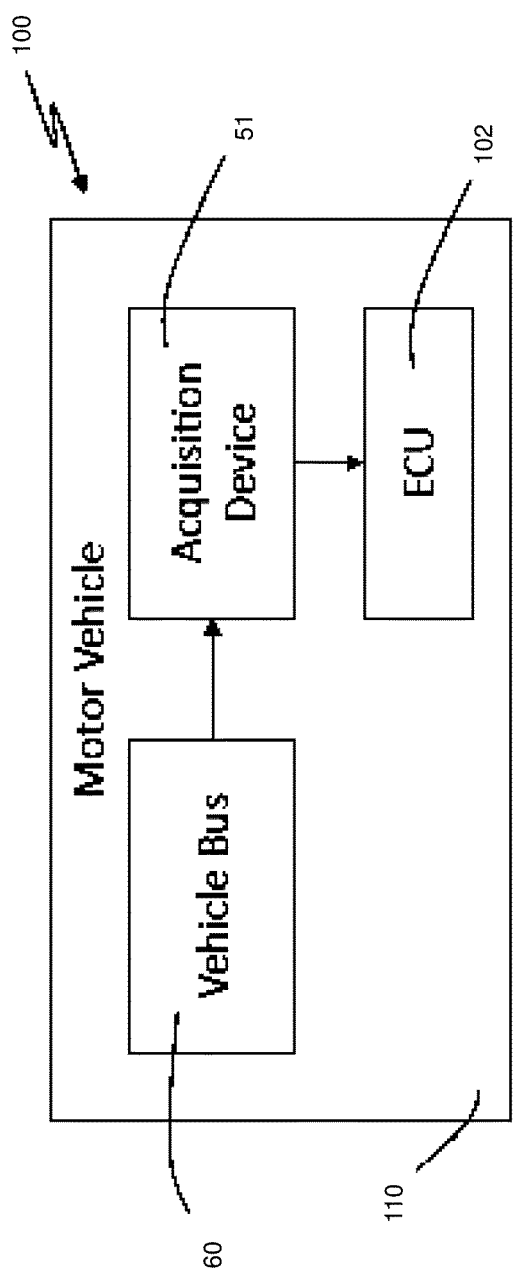

FIGS. 9 and 10 schematically illustrate further preferred embodiments for implementing the processing means 52 of the system 50 of FIG. 8.

In particular, with reference to FIG. 9, in a first preferred embodiment (denoted as a whole by 70), the processing means 52 are implemented/carried out by means of a cloud computing system 72 that is wirelessly and remotely connected to the acquisition device (s) 51 (e.g., via one or more cellular technologies, such as GSM, GPRS, EDGE, HSPA, UMTS, LTE, LTE Advanced, 5G, etc.), and that is conveniently used to perform both the preliminary step 1 and the IRI estimation step 10.

Instead, with reference to FIG. 10, in a second preferred embodiment (denoted as a whole by 100), the processing means 52 are implemented/carried out by means of an (automotive) Electronic Control Unit (ECU) 102 installed on board a motor vehicle 110, wherein said ECU 102 may conveniently be an ECU specifically dedicated to IRI estimation, or an ECU dedicated to several tasks including also IRI estimation.

Preferably, the cloud computing system 72 is used to carry out the preliminary step 1, whereas the ECU 102 is used to perform the IRI estimation step 10. In particular, a respective ECU 102 can be conveniently installed on board each given motor vehicle 110 involved in the IRI estimation step 10 to acquire, from the respective acquisition device 51, the second vehicle vertical acceleration values and the second vehicle geo-referencing and speed data.

From the foregoing, the technical advantages and the innovative features of the present invention are immediately clear to those skilled in the art.

In particular, the present method allows to exploit the vehicle vertical acceleration values at given constant speed to measure preliminary IRI values on the driven roads with a frequency higher than the normal common methods used in the roads measuring procedures.

Furthermore, the present method have a wider and more frequent measuring network that would allow roads management companies to prioritize more accurate measurements in specific road segments.

Additionally, the present method allows to implement a faster and easier quantification of roughness of road pavements and, in particular, an IRI-like estimation, which are easier to perform and can be carried out more frequently than traditional IRI measurements In conclusion, it is clear that numerous modifications and variants can be made to the present invention, which fall within the scope of the invention as defined in the attached claims.

The invention claimed is:

1. A method for estimating an International Roughness Index (IRI) of a road or road segment, the method comprising:
in a preliminary stage:
collecting values of vehicle tire damping and stiffness coefficients of one or more tires;
collecting:
first vehicle vertical acceleration values measured on one or more motor vehicles driven at one or more given constant speeds along one or more roads or road segments to which known IRI values or known first road profiles are associated;
first vehicle geo-referencing data associated with the measured first vertical acceleration values; and first vehicle speed data indicative of the one or more given constant speeds associated with the measured first vertical acceleration values;

determining second road profiles based on the values of vehicle tire damping and stiffness coefficients, the first vehicle geo-referencing data, the first vehicle speed data, and the first vehicle vertical acceleration values;

determining second vehicle vertical acceleration values based on the second road profiles, second vehicle geo-referencing data of the second vertical acceleration values, second vehicle speed data indicative of the one or more given constant speeds associated with the measured first vertical acceleration values, and the values of vehicle tire damping and stiffness coefficients;

determining values of vehicle suspension damping and stiffness coefficients of one or more suspensions of one or more vehicles;

determining first and second root mean square values of the first and second vehicle vertical acceleration values, respectively;

determining, based on the known IRI values or the first road profiles on the second root mean square values of the second vehicle vertical acceleration values, on the second vehicle geo-referencing data and on second vehicle speed data, one or more vehicle transfer functions mathematically relating the second root mean square values of the second vehicle vertical acceleration values and the IRI values at the one or more given constant speeds; and in an IRI estimation stage:

acquiring third vehicle vertical acceleration values measured on a given motor vehicle driven at a driving speed on a given road or road segment, third vehicle geo-referencing data associated with the third vehicle vertical acceleration values, and third vehicle speed data indicative of the given driving speed of the motor vehicle;

computing third root mean square values of the third vehicle vertical acceleration values; and estimating an IRI value of the given road or road segment based on one or more vehicle transfer functions determined in the preliminary stage and on the third root mean square values of the third vehicle vertical acceleration values and the associated third vehicle geo-referencing data and the third vehicle speed data.

2. The method of claim 1, wherein:
the first vehicle vertical acceleration values, the first vehicle geo-referencing data, and the first vehicle speed data are collected with respect to one or more motor vehicles of one and the same given vehicle type and/or of one and the same given vehicle model driven at one or more given constant speeds along one or more roads or road segments to which known IRI values or the first road profiles are associated; and
the second road profiles are specific to the given vehicle type and/or given vehicle model.

3. The method of claim 2, wherein the IRI value is estimated by using a vehicle transfer function specific to vehicle type/model of the given motor vehicle determined in the preliminary stage.

4. The method of claim 1, wherein:
the first vehicle vertical acceleration values, the first vehicle geo-referencing data, and the first vehicle speed data are collected with respect to each of one or more motor vehicles of different given vehicle types and/or of different given vehicle models; and
the second road profiles are specific to each one of the given vehicle types and/or given vehicle models.

5. The method of claim 4, wherein the IRI value is estimated by using a vehicle transfer function specific to vehicle type/model of the given motor vehicle determined in the preliminary stage.

6. The method of claim 1, wherein:
the step of determining the values of vehicle suspension damping and stiffness coefficients of the one or more suspensions of the one or more vehicles comprises:
determining, for test vehicle suspension damping and stiffness coefficients values of the suspensions of the vehicle inputted in the second road profiles, corresponding second vehicle vertical acceleration values;
verifying if the second acceleration profiles generated from the second vehicle vertical acceleration values fit with first acceleration profiles generated from the first vehicle vertical acceleration values; and
if the second acceleration profiles generated from the second vehicle vertical acceleration values fit with the first acceleration profiles generated from the first vehicle vertical acceleration values, determining that the test vehicle damping and stiffness coefficients values of the suspensions of the vehicle are the vehicle suspension damping and stiffness coefficients; or
if the second acceleration profiles generated from the second vehicle vertical acceleration values do not fit with the first acceleration profiles generated from the first vehicle vertical acceleration values, determining new values for the test vehicle suspension damping and stiffness coefficients values.

7. The method of claim 1, wherein the step of determining the first and second root mean square values of the first and second vehicle vertical acceleration values, respectively comprises:
computing first root mean square values of the first vehicle vertical acceleration values based on the first road profiles and with respect to a motor vehicle driven on a known road at known different speeds;
determining second root mean square values of the second vehicle vertical acceleration values based on the second road profiles, the vehicle suspension damping and stiffness coefficients values and with respect to a motor vehicle driven on the same known road and at the same known different speeds; and
plotting the first root mean square values of the first vehicle vertical acceleration values with respect to the second root mean square values of the second vehicle vertical acceleration values, thereby verifying if the second road profiles has been fitted well enough to match the results of the first road profiles.

8. A system for estimating an International Roughness Index (IRI) of a road or road segment, the system comprising:
a respective first acquisition device installed on board and coupled to a respective vehicle bus for each of a first set of one or more first motor vehicles;
a respective second acquisition device installed on board and coupled to a respective vehicle bus for each of a second set of one or more second motor vehicles;
a cloud computing system remotely connected to the first and second acquisition devices and configured, in a preliminary stage, to:

collect values of vehicle tire damping and stiffness coefficients of one or more tires;
collect, via the one or more first acquisition devices:
   first vehicle vertical acceleration values measured on one or more of the first set of motor vehicles driven at one or more given constant speeds along one or more roads or road segments to which known IRI values or known first road profiles are associated;
   first vehicle geo-referencing data associated with the measured first vertical acceleration values; and
   first vehicle speed data indicative of the one or more given constant speeds associated with the measured first vertical acceleration values;
determine second road profiles based on the values of vehicle tire damping and stiffness coefficients, the first vehicle geo-referencing data, the first vehicle speed data, and the first vehicle vertical acceleration values;
determine second vehicle vertical acceleration values based on the second road profiles, second vehicle geo-referencing data of the second vertical acceleration values, second vehicle speed data indicative of the one or more given constant speeds associated with the measured first vertical acceleration values, and the values of vehicle tire damping and stiffness coefficients;
determine values of vehicle suspension damping and stiffness coefficients of one or more suspensions of one or more vehicles;
determine first and second root mean square values of the first and second vehicle vertical acceleration values, respectively; and
determine, based on the known IRI values or the first road profiles on the second root mean square values of the second vehicle vertical acceleration values, on the second vehicle geo-referencing data and on second vehicle speed data, one or more vehicle transfer functions mathematically relating the second root mean square values of the second vehicle vertical acceleration values and the IRI values at the one or more given constant speeds;
the cloud computing system further configured, in an IRI estimation stage, to:
   acquire, via the one or more second acquisition devices, third vehicle vertical acceleration values measured on a given motor vehicle driven at a driving speed on a given road or road segment, third vehicle geo-referencing data associated with the third vehicle vertical acceleration values, and third vehicle speed data indicative of the given driving speed of the motor vehicle;
   compute third root mean square values of the third vehicle vertical acceleration values; and
   estimate an IRI value of the given road or road segment based on one or more vehicle transfer functions determined in the preliminary stage and on the third root mean square values of the third vehicle vertical acceleration values and the associated third vehicle geo-referencing data and the third vehicle speed data.

9. The system of claim 8, wherein:
the first vehicle vertical acceleration values, the first vehicle geo-referencing data, and the first vehicle speed data are collected with respect to one or more motor vehicles of one and the same given vehicle type and/or of one and the same given vehicle model driven at one or more given constant speeds along one or more roads or road segments to which known IRI values or the first road profiles are associated; and
the second road profiles are specific to the given vehicle type and/or given vehicle model.

10. The system of claim 9, wherein the IRI value is estimated by using a vehicle transfer function specific to vehicle type/model of the given motor vehicle determined in the preliminary stage.

11. The system of claim 8, wherein:
the first vehicle vertical acceleration values, the first vehicle geo-referencing data, and the first vehicle speed data are collected with respect to each of one or more motor vehicles of different given vehicle types and/or of different given vehicle models; and
the second road profiles are specific to each one of the given vehicle types and/or given vehicle models.

12. The system of claim 11, wherein the IRI value is estimated by using a vehicle transfer function specific to vehicle type/model of the given motor vehicle determined in the preliminary stage.

13. The system of claim 8, wherein:
the cloud computing system is configured to determine the values of vehicle suspension damping and stiffness coefficients of the one or more suspensions of the one or more vehicles by:
   determining, for test vehicle suspension damping and stiffness coefficients values of the suspensions of the vehicle inputted in the second road profiles, corresponding second vehicle vertical acceleration values;
   verifying if the second acceleration profiles generated from the second vehicle vertical acceleration values fit with first acceleration profiles generated from the first vehicle vertical acceleration values; and
   if the second acceleration profiles generated from the second vehicle vertical acceleration values fit with the first acceleration profiles generated from the first vehicle vertical acceleration values, determining that the test vehicle damping and stiffness coefficients values of the suspensions of the vehicle are the vehicle suspension damping and stiffness coefficients; or
   if the second acceleration profiles generated from the second vehicle vertical acceleration values do not fit with the first acceleration profiles generated from the first vehicle vertical acceleration values, determining new values for the test vehicle suspension damping and stiffness coefficients values.

14. The system of claim 8, wherein the cloud computing system is configured to determine the first and second root mean square values of the first and second vehicle vertical acceleration values, respectively, by:
   computing first root mean square values of the first vehicle vertical acceleration values based on the first road profiles and with respect to a motor vehicle driven on a known road at known different speeds;
   determining second root mean square values of the second vehicle vertical acceleration values based on the second road profiles, the vehicle suspension damping and stiffness coefficients values and with respect to a motor vehicle driven on the same known road and at the same known different speeds; and
   plotting the first root mean square values of the first vehicle vertical acceleration values with respect to the second root mean square values of the second vehicle vertical acceleration values, thereby verifying if the second road profiles has been fitted well enough to match the results of the first road profiles.

15. A system for estimating an International Roughness Index (IRI) of a road or road segment, the system comprising:
a respective first acquisition device installed on board and coupled to a respective vehicle bus for each of a first set of one or more first motor vehicles;
a respective second acquisition device installed on board and coupled to a respective vehicle bus for each of a second set of one or more second motor vehicles;
a cloud computing system remotely connected to the first acquisition devices and configured, in a preliminary stage, to:
collect values of vehicle tire damping and stiffness coefficients of one or more tires;
collect, via the one or more first acquisition devices:
first vehicle vertical acceleration values measured on one or more of the first set of motor vehicles driven at one or more given constant speeds along one or more roads or road segments to which known IRI values or known first road profiles are associated;
first vehicle geo-referencing data associated with the measured first vertical acceleration values; and
first vehicle speed data indicative of the one or more given constant speeds associated with the measured first vertical acceleration values;
determine second road profiles based on the values of vehicle tire damping and stiffness coefficients, the first vehicle geo-referencing data, the first vehicle speed data, and the first vehicle vertical acceleration values;
determine second vehicle vertical acceleration values based on the second road profiles, second vehicle geo-referencing data of the second vertical acceleration values, second vehicle speed data indicative of the one or more given constant speeds associated with the measured first vertical acceleration values, and the values of vehicle tire damping and stiffness coefficients;
determine values of vehicle suspension damping and stiffness coefficients of one or more suspensions of one or more vehicles;
determine first and second root mean square values of the first and second vehicle vertical acceleration values, respectively; and
determine, based on the known IRI values or the first road profiles on the second root mean square values of the second vehicle vertical acceleration values, on the second vehicle geo-referencing data and on second vehicle speed data, one or more vehicle transfer functions mathematically relating the second root mean square values of the second vehicle vertical acceleration values and the IRI values at the one or more given constant speeds;
for each of the one or more second motor vehicles, a respective electronic control unit installed on board thereof and connected to the respective second acquisition device, wherein each respective electronic control unit is configured, in an IRI estimation stage, to:
acquire, via the respective second acquisition device, third vehicle vertical acceleration values measured on a given motor vehicle driven at a driving speed on a given road or road segment, third vehicle geo-referencing data associated with the third vehicle vertical acceleration values, and third vehicle speed data indicative of the given driving speed of the motor vehicle;
compute third root mean square values of the third vehicle vertical acceleration values; and
estimate an IRI value of the given road or road segment based on one or more vehicle transfer functions determined in the preliminary stage and on the third root mean square values of the third vehicle vertical acceleration values and the associated third vehicle geo-referencing data and the third vehicle speed data.

16. The system of claim 15, wherein:
the first vehicle vertical acceleration values, the first vehicle geo-referencing data, and the first vehicle speed data are collected with respect to one or more motor vehicles of one and the same given vehicle type and/or of one and the same given vehicle model driven at one or more given constant speeds along one or more roads or road segments to which known IRI values or the first road profiles are associated; and
the second road profiles are specific to the given vehicle type and/or given vehicle model.

17. The system of claim 16, wherein the IRI value is estimated by using a vehicle transfer function specific to vehicle type/model of the given motor vehicle determined in the preliminary stage.

18. The system of claim 15, wherein:
the first vehicle vertical acceleration values, the first vehicle geo-referencing data, and the first vehicle speed data are collected with respect to each of one or more motor vehicles of different given vehicle types and/or of different given vehicle models; and
the second road profiles are specific to each one of the given vehicle types and/or given vehicle models.

19. The system of claim 15, wherein:
the cloud computing system is configured to determine the values of vehicle suspension damping and stiffness coefficients of the one or more suspensions of the one or more vehicles by:
determining, for test vehicle suspension damping and stiffness coefficients values of the suspensions of the vehicle inputted in the second road profiles, corresponding second vehicle vertical acceleration values;
verifying if the second acceleration profiles generated from the second vehicle vertical acceleration values fit with first acceleration profiles generated from the first vehicle vertical acceleration values; and
if the second acceleration profiles generated from the second vehicle vertical acceleration values fit with the first acceleration profiles generated from the first vehicle vertical acceleration values, determining that the test vehicle damping and stiffness coefficients values of the suspensions of the vehicle are the vehicle suspension damping and stiffness coefficients; or
if the second acceleration profiles generated from the second vehicle vertical acceleration values do not fit with the first acceleration profiles generated from the first vehicle vertical acceleration values, determining new values for the test vehicle suspension damping and stiffness coefficients values.

20. The system of claim 15, wherein the cloud computing system is configured to determine the first and second root mean square values of the first and second vehicle vertical acceleration values, respectively, by:

computing first root mean square values of the first vehicle vertical acceleration values based on the first road profiles and with respect to a motor vehicle driven on a known road at known different speeds;

determining second root mean square values of the second vehicle vertical acceleration values based on the second road profiles, the vehicle suspension damping and stiffness coefficients values and with respect to a motor vehicle driven on the same known road and at the same known different speeds; and plotting the first root mean square values of the first vehicle vertical acceleration values with respect to the second root mean square values of the second vehicle vertical acceleration values, thereby verifying if the second road profiles has been fitted well enough to match the results of the first road profiles.

* * * * *

UNITED STATES PATENT AND TRADEMARK OFFICE
CERTIFICATE OF CORRECTION

| | |
|---|---|
| PATENT NO. | : 12,434,711 B2 |
| APPLICATION NO. | : 18/288398 |
| DATED | : October 7, 2025 |
| INVENTOR(S) | : Alleva et al. |

It is certified that error appears in the above-identified patent and that said Letters Patent is hereby corrected as shown below:

On the Title Page
Item (72) INVENTORS
Delete "Alberto Nantuono, Roma (IT)" and substitute therefor "Alberto Iannantuono, Roma (IT)"

Signed and Sealed this
Second Day of December, 2025

John A. Squires
*Director of the United States Patent and Trademark Office*